United States Patent
Hall

(10) Patent No.: US 10,522,185 B1
(45) Date of Patent: Dec. 31, 2019

(54) DATA STORAGE DEVICE SORTING EXECUTION ORDER OF COMMANDS BASED ON A PREDICTED FUTURE COMMAND

(71) Applicant: Western Digital Technologies, Inc., San Jose, CA (US)

(72) Inventor: David R. Hall, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/271,793

(22) Filed: Feb. 9, 2019

(51) Int. Cl.
*G11B 21/02* (2006.01)
*G11B 5/012* (2006.01)
*G11B 5/54* (2006.01)
*G11B 5/55* (2006.01)

(52) U.S. Cl.
CPC ............ *G11B 21/025* (2013.01); *G11B 5/012* (2013.01); *G11B 5/54* (2013.01); *G11B 5/55* (2013.01); *G11B 21/02* (2013.01); *G11B 21/022* (2013.01)

(58) Field of Classification Search
None
See application file for complete search history.

(56) References Cited

U.S. PATENT DOCUMENTS

| | | | | |
|---|---|---|---|---|
| 5,991,825 A * | 11/1999 | Ng | ............ | G06F 3/0611 710/39 |
| 6,272,565 B1 * | 8/2001 | Lamberts | .............. | G06F 3/0613 360/72.2 |
| 6,418,510 B1 * | 7/2002 | Lamberts | .............. | G06F 3/0611 710/43 |
| 6,957,311 B2 * | 10/2005 | Kanamaru | .......... | G06F 12/0868 710/39 |
| 6,968,422 B1 * | 11/2005 | Codilian | ............. | G11B 5/5547 360/99.08 |
| 7,114,029 B1 * | 9/2006 | Thelin | .................. | G06F 12/0804 711/112 |
| 7,450,334 B1 * | 11/2008 | Wang | .................. | G06F 12/0862 360/75 |
| 8,090,902 B1 * | 1/2012 | Bennett | ................ | G11B 5/5565 711/111 |
| 9,471,221 B2 | 10/2016 | Haines et al. | | |
| 2003/0056034 A1 | 3/2003 | Olds et al. | | |
| 2012/0124244 A1 * | 5/2012 | Yew | ........................ | G06F 9/451 710/7 |

* cited by examiner

*Primary Examiner* — Tan X Dinh

(57) ABSTRACT

A data storage device is disclosed comprising a head actuated over a disk. A plurality of access commands are stored in a command queue, wherein the access commands are for accessing the disk using the head. A future access command is predicted, and an execution order for the access commands in the command queue is determined based on an associated execution cost of at least some of the access commands in the command queue and an associated execution cost of the future access command. At least one of the access commands in the command queue is executed based on the execution order.

20 Claims, 5 Drawing Sheets

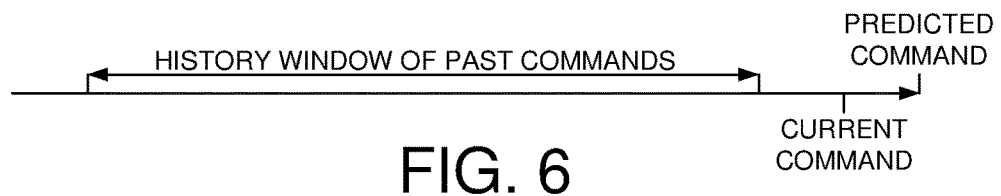
FIG. 6
|   | A   | B   | C   | D   | E   | F   | G   |
|---|-----|-----|-----|-----|-----|-----|-----|
| A | x   | 5.1 | 5.2 | 6.2 | 6.2 | 4.4 | 8.6 |
| B | 3.1 | x   | 4.6 | 7.3 | 9.6 | 5.2 | 3.7 |
| C | 8.4 | 7.1 | x   | 9.2 | 4.2 | 8.4 | 2.8 |
| D | 4.2 | 6.8 | 7.7 | x   | 5.7 | 3.6 | 4.5 |
| E | 6.9 | 8.7 | 6.4 | 7.0 | x   | 3.8 | 9.0 |
| F | 9.1 | 7.7 | 6.9 | 9.7 | 6.2 | x   | 3.4 |
| G | 7.2 | 8.9 | 8.5 | 2.6 | 4.8 | 8.2 | x   |
FIG. 7
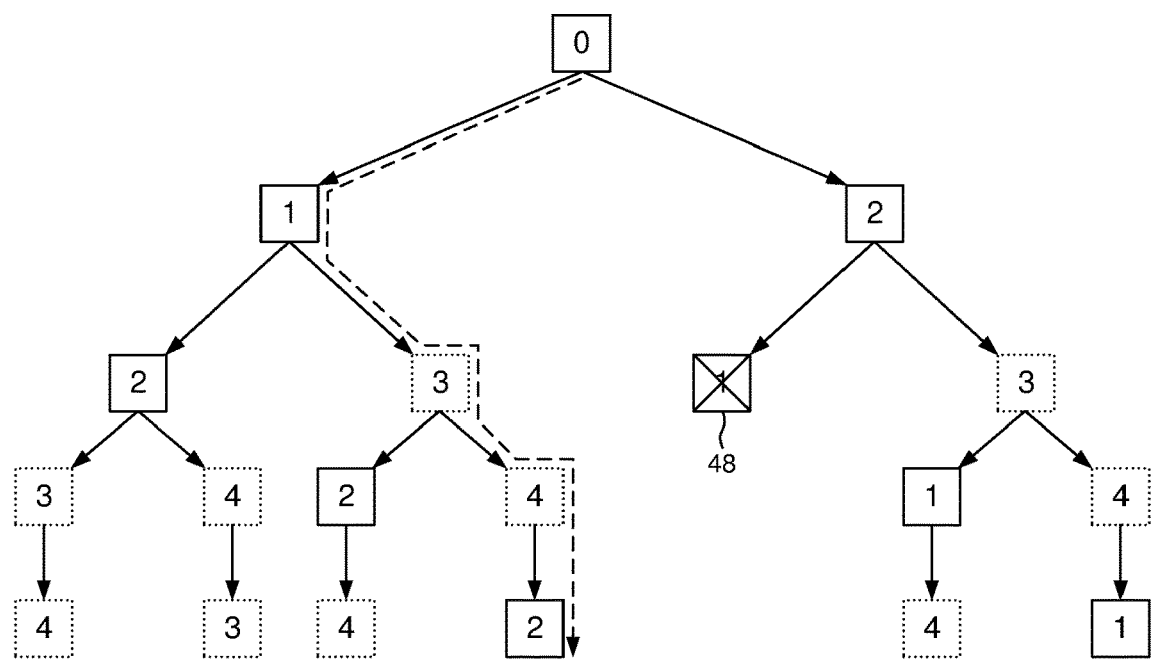
FIG. 8

DATA STORAGE DEVICE SORTING EXECUTION ORDER OF COMMANDS BASED ON A PREDICTED FUTURE COMMAND

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 6 shows an embodiment wherein a future access command is predicted based on a history of previously executed access commands.

FIG. 7 shows an embodiment wherein an execution cost associated with a given execution order of access commands may be cached in order to reduce the execution time of a tree search algorithm that sorts the execution order for access commands.

FIG. 8 shows an embodiment wherein node pruning may be employed to reduce the execution time of a tree search algorithm that sorts the execution order for access commands.

DETAILED DESCRIPTION

Figure 2A:
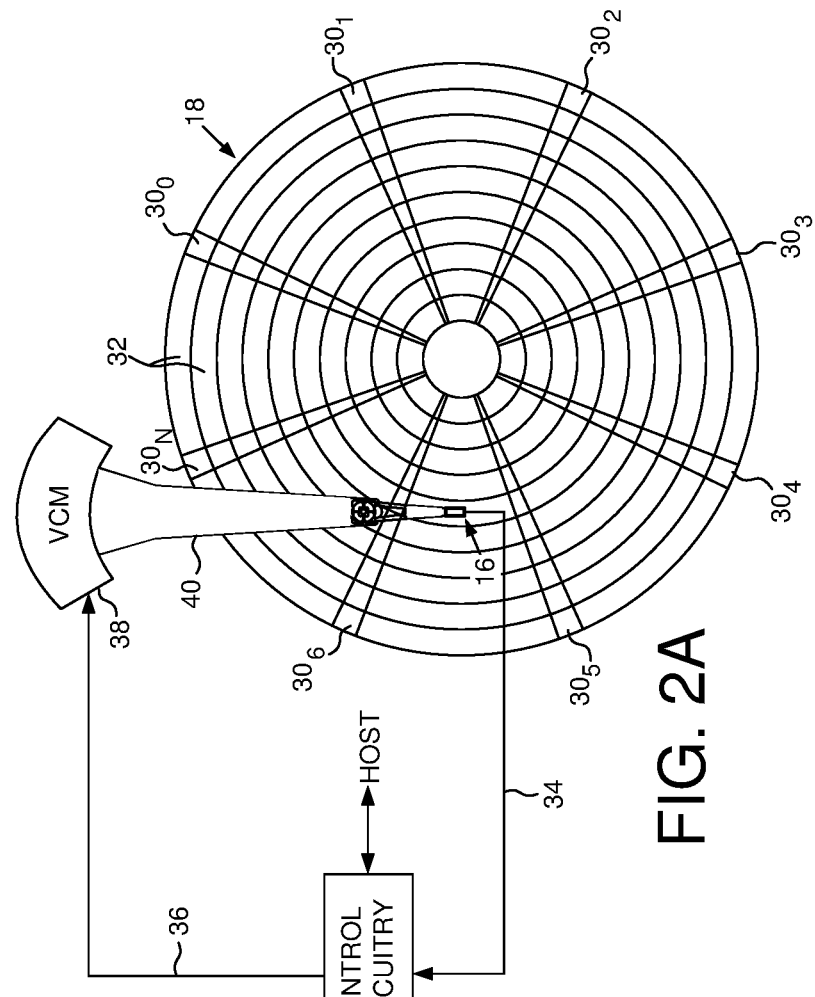
FIG. 2A shows a data storage device in the form of a disk drive according to an embodiment comprising a head actuated over a disk.
Figure 2B:
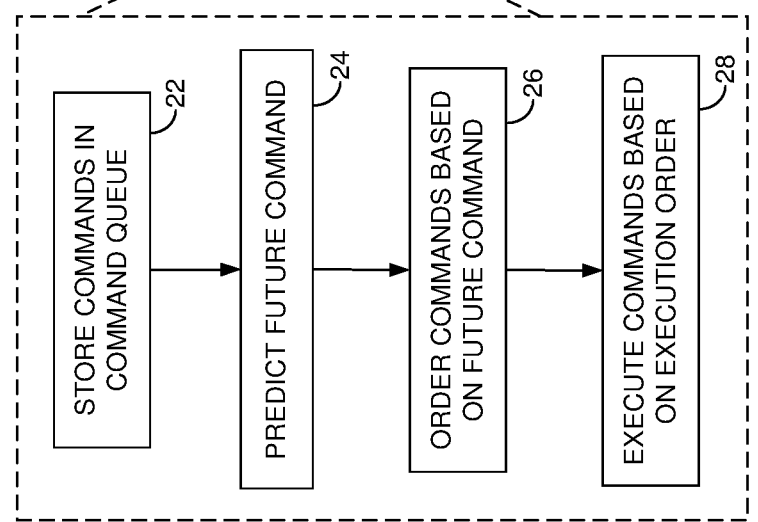
FIG. 2B is a flow diagram according to an embodiment wherein access commands stored in a command queue are sorted based on at least one predicted future access command.

FIGS. 2A and 2B show a data storage device in the form of a disk drive according to an embodiment comprising a head 16 actuated over a disk 18. The disk drive further comprises control circuitry 20 configured to execute the flow diagram of FIG. 2B, wherein a plurality of access commands are stored in a command queue (block 22). A future access command is predicted (block 24), and an execution order for the access commands in the command queue is determined based on an associated execution cost of at least some of the access commands in the command queue and an associated execution cost of the future access command (block 26). At least one access command in the command queue is executed based on the execution order (block 28).

Figure 1:
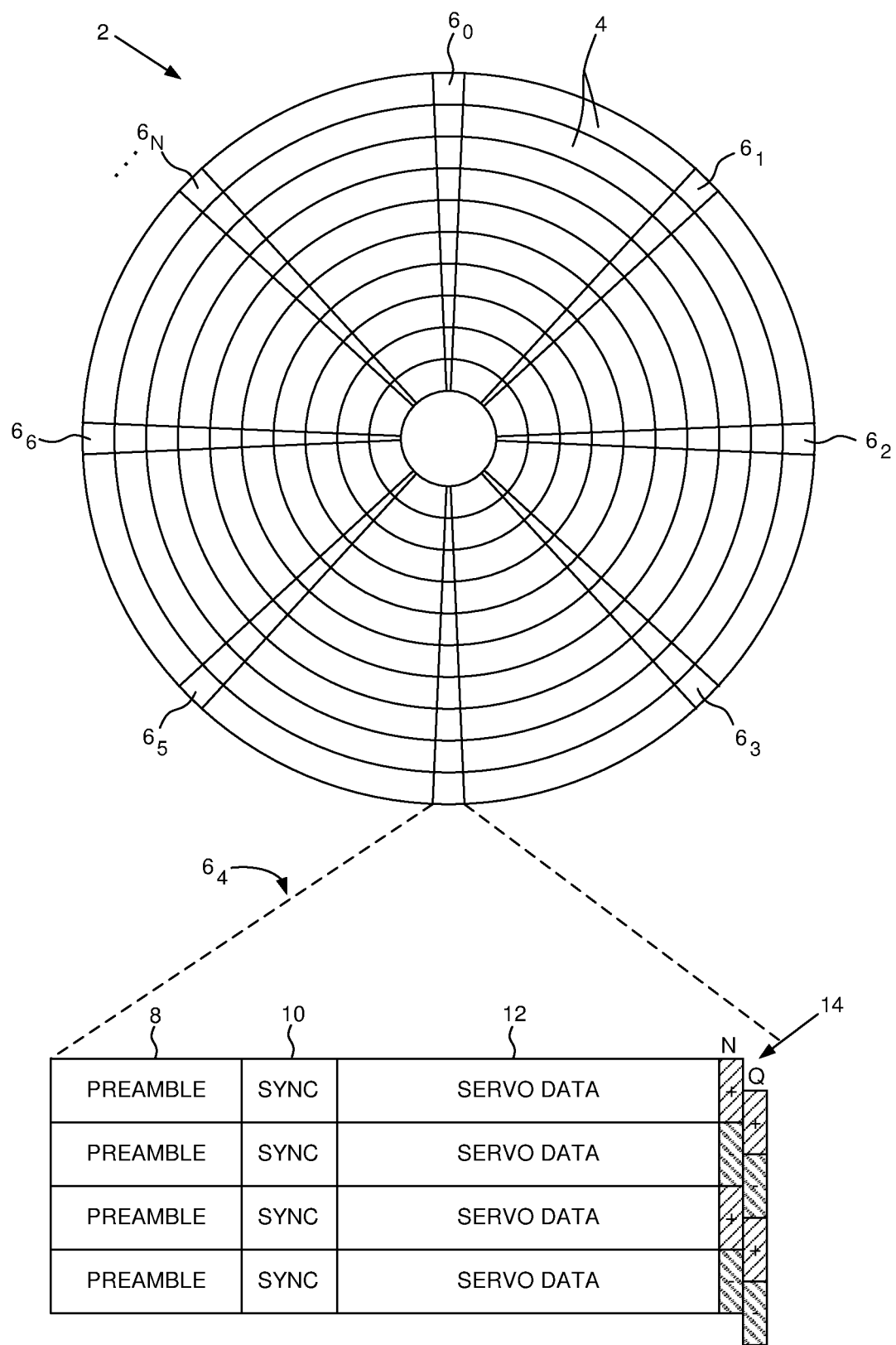
FIG. 1 shows a prior art disk format comprising a plurality of servo tracks defined by servo sectors.

In the embodiment of FIG. 2A, the disk 18 comprises a plurality of servo sectors $30_0$-$30_N$ that define a plurality of servo tracks, wherein data tracks 32 are defined relative to the servo tracks at the same or different radial density. The control circuitry 20 processes a read signal 34 emanating from the head 16 to demodulate the servo sectors and generate a position error signal (PES) representing an error between the actual position of the head and a target position relative to a target track. A servo control system in the control circuitry 20 filters the PES using a suitable compensation filter to generate a control signal 36 applied to a VCM 38 which rotates an actuator arm 40 about a pivot in order to actuate the head radially over the disk in a direction that reduces the PES. The servo sectors $30_0$-$30_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 3A:
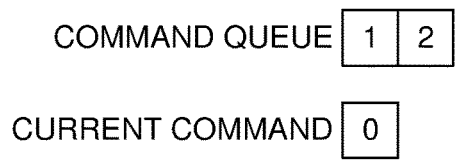
FIGS. 3A and 3B show a prior art tree search for sorting the execution order of two access commands stored in a command queue.
Figure 3B:
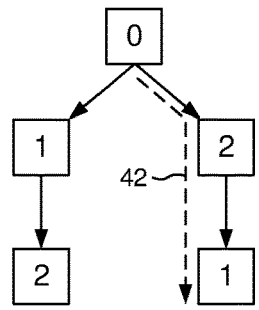

A disk drive typically stores a number of access commands in a command queue that are sorted into an execution order based on any suitable execution cost associated with each access command. Any suitable algorithm may be used to sort the access commands into an execution order, such as a rotational position optimization (RPO) algorithm which attempts to execute the access commands in an order that minimizes the mechanical latency of the disk drive (e.g., seek and rotational latency) so as to optimize the throughput performance of the disk drive. FIG. 3A shows a prior art example wherein the command queue stores two access commands (commands {1} and {2}) that may be sorted into an execution order while processing a current access command (command {0}). FIG. 3B shows a prior art example for sorting the access commands based on a tree search, wherein the execution cost may be determined for each node of the tree, and the execution order selected based on the path through the tree that minimizes the accumulated execution cost. In the example of FIG. 3B, the path 42 corresponds to the smallest accumulated execution cost, and therefore the access commands are executed based on the corresponding execution order {2,1} as compared to execution order {1,2}.

Figure 4A:
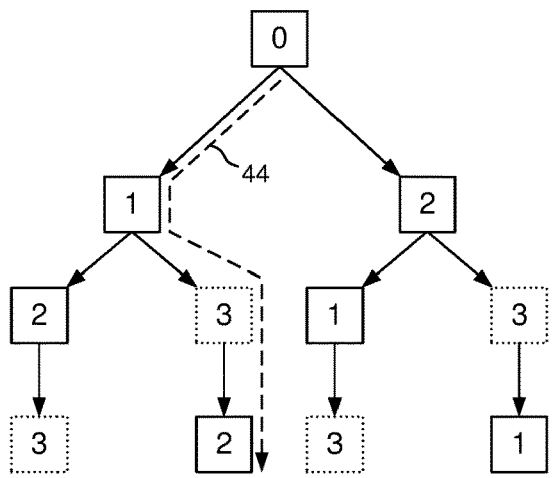
FIG. 4A shows an embodiment wherein a tree search is used to sort the execution order of two access commands stored in a command queue based on a predicted future access command.

Prior art sorting algorithms for selecting the execution order for the queued access commands are typically suboptimal since they do not take into account the effect of future access commands on the accumulated execution cost. FIG. 4A shows an embodiment for sorting the two access commands in the command queue of FIG. 3A after modifying the sort algorithm to consider the effect of a predicted future access command {3} on the accumulated execution cost of each path through a search tree. After finishing execution of the current access command {0} and while executing the next access command {1} or {2}, a new access command {3} may be inserted into the command queue that may affect the optimal path through the search tree. Accordingly, in one embodiment a future access command is predicted and used to sort the access commands already queued in the command queue. In the example of FIG. 4A, the effect of the predicted future access command {3} is to change the optimal path through the search tree to path 44 such that the execution order becomes {1,3,2}. That is, in FIG. 4A the effect of the predicted future access command {3} changes the execution order as compared to FIG. 3B so that access command {1} is executed before access command {2}. In one embodiment, the likelihood of accurately predicting the future access command {3} is high enough so as to provide a better operating performance on average as compared to a prior art sort algorithm that does not predict future access commands.

Figure 4B:
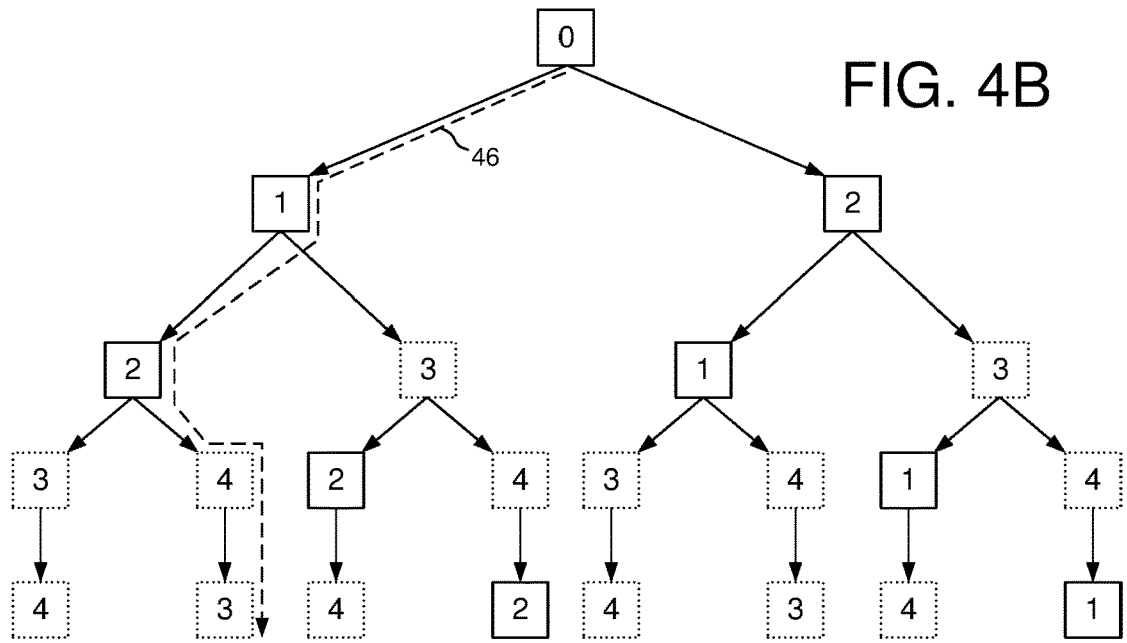
FIG. 4B shows an embodiment wherein a tree search is used to sort the execution order of two access commands stored in a command queue based on multiple predicted future access commands.

FIG. 4B shows an embodiment wherein two or more future access commands may be predicted and used to sort the access commands already queued in the command queue. In the example of FIG. 4B, the effect of the predicted future access commands {3,4} is to change the optimal path through the search tree to path 46 such that the execution order becomes {1,2,4,3}. FIG. 4B illustrates that each additional predicted future access command increases the depth of the search tree, and therefore may increase the processing time needed to search each path through the tree. In one embodiment, the number of future access commands predicted and considered by the sort algorithm may vary over time, for example, based on the workload of the disk drive and the amount of processing time allocated to the sort algorithm. In other embodiments described below, the processing time of the sort algorithm may be reduced by caching the execution cost for a number of the branches (or multiple of the branches) or by pruning nodes of the search tree when the accumulated execution cost exceeds a threshold. Accordingly in these embodiments, the number of predicted future access commands considered by the sort algorithm may vary based on the processing time allocated to the sort algorithm and the degree to which the sort algorithm is optimized, for example, by cost caching or node pruning techniques.

In one embodiment, the execution cost of the predicted future access commands may be weighted based on a confidence metric of the prediction. For example, in one embodiment when the confidence metric is low indicating a lower likelihood the prediction is accurate, the corresponding execution cost for the future access command may be increased, for example, by multiplying the execution cost by a weight that is greater than one or by adding a non-zero weight to the execution cost. In one embodiment, as the confidence metric increases and the corresponding likelihood of an accurate prediction increases, the corresponding weight for scaling the execution cost may decrease. In other words, in one embodiment the likelihood of accurately predicting a future access command may itself be considered as part of the execution cost of the future access command, with this additional cost approaching zero as the confidence metric approaches unity (meaning one hundred percent accurate prediction).

Figure 5C:
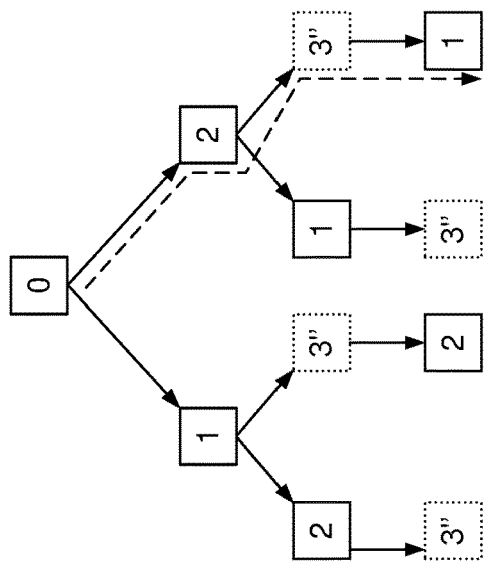
FIGS. 5A-5C show an embodiment wherein multiple instances of a tree search are used to sort the execution order of two access commands stored in a command queue based on alternate possibilities for a predicted future access command.
Figure 5B:
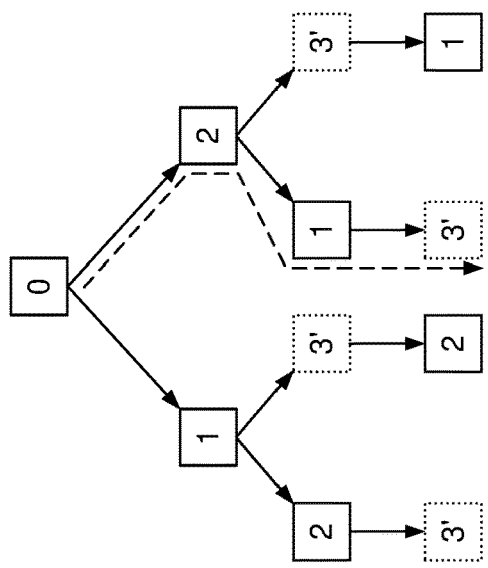
Figure 5A:
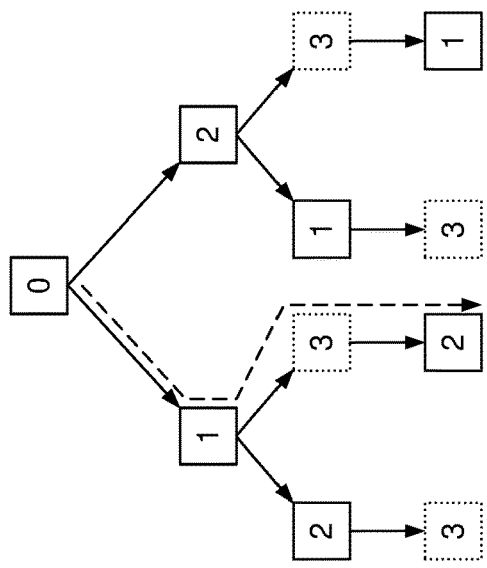

In one embodiment, the sort algorithm may execute multiple runs (e.g., searching through multiple search trees), wherein each run may be executed using a different predicted future access command (similar to executing Monte Carlo runs). An example of this embodiment is shown in FIGS. 5A-5C which shows multiple runs of a sort algorithm based on a tree search, wherein for each run a different future access command is predicted (represented as {3}, {3'} and {3"}). In the example of FIGS. 5A-5C, a different path is selected through each tree depending on which future access command is being considered. In one embodiment, after executing multiple runs of the sort algorithm using a different future access command, the execution costs of the resulting optimal paths are compared, and the queued access commands are sorted based on the path with the lowest execution cost. Similar to the embodiment described above, in this embodiment a confidence metric may be associated with each future access command so as to weight the corresponding execution cost. In yet another embodiment, two or more future access commands may be considered across the multiple runs of the sort algorithm similar to the embodiment described above with reference to FIG. 4B. In still another embodiment, the number of runs and number of corresponding future access commands may vary based on the processing time allocated to the sort algorithm and/or optimizations (e.g., cost caching or node pruning) that may reduce the processing time of the sort algorithm.

Any suitable technique may be employed to predict a future access command in the embodiments described above. In one embodiment shown in FIG. 6, a future access command may be predicted based on a history of past access commands. For example, in one embodiment there may be an increased likelihood that a previously executed access command will be executed again in the future. In one embodiment, the likelihood of re-executing an access command may depend on the recency of when the access command was previously executed. In the example of FIG. 6, a history window may be defined over a number of previously executed access commands, wherein the access command within this history window may have the highest probability of being re-executed. Older access commands outside of the history window as well as the most recently executed access commands have a lower likelihood of being re-executed in the near future, and therefore may be excluded from the history window as shown in the example of FIG. 6.

In another embodiment, the sequence or pattern of access commands within the history window may be matched to previously saved patterns in order to predict a future access command. For example, if the recently executed access commands begin to match a previously saved pattern, there may be a high probability that the future access commands will be part of the saved pattern. Similar to the embodiments described above, a confidence metric may be generated for each predicted future access command, and the future access command(s) having the highest confidence metric may be selected for consideration by the sort algorithm.

In yet another embodiment, the control circuitry 20 may execute background tasks that may include the execution of access commands. An example of a background task is the need to refresh data recorded in a target data track due to adjacent track interference (ATI) caused by writing the adjacent (or near adjacent) data tracks. In one embodiment, refreshing a target data track involves reading and then rewriting the data to the same or a different data track. In one embodiment, a target data track that may need refreshing may be assigned an "urgency" metric that may be based on, for example, the number of writes to the adjacent data tracks. In one embodiment, the urgency metric assigned to a target data track may correlate with the likelihood that the corresponding access commands will be executed in the future. That is, as the urgency metric increases the confidence metric in predicting a future access command may increase since it becomes more likely that these background access commands are selected for execution (inserted into the command queue).

As indicated above, the processing time of the sort algorithm for configuring the execution order of the queued access commands may vary depending on the number of consecutive future access commands considered (e.g., the depth of a search tree as in FIG. 4B), or the number of Monte Carlo runs executed (e.g., the number of search trees processed as in FIGS. 5A-5C), etc. In one embodiment, a number of techniques may be employed to decrease the processing time of the sort algorithm, thereby enabling additional future access commands to be considered (e.g., increasing the depth of a search tree), or enabling more Monte Carlo runs to be executed, etc. In an embodiment shown in FIG. 7, the execution cost associate with a particular branch in a search tree may be cached so that when the sort algorithm encounters the same branch during the search of a path through the tree, the cached execution cost may be used rather than recomputing the execution cost. The values shown in the table of FIG. 7 may represent any suitable execution cost, such as a seek time to seek the head from a current data track to a target data track. In one embodiment, the table of FIG. 7 may be extended to cache the execution cost associated with multiple consecutive branches. For example, a table may be generated that stores the execution cost of two consecutive branches through the search tree, such as the execution cost associated with path A->F->C.

In some embodiments, there may be multiple types of execution costs considered (e.g., throughput performance, power consumption, on-track latency, or tail latency, etc.). According in these embodiments a cache table may be generated for each type of execution cost so that the execution costs may be considered separately by the sort algorithm. In one embodiment, the sort algorithm may weight the different types of execution costs when generating an overall execution cost for each possible execution order. In this manner, the weighting of each type of execution cost may be configured based on the needs of a particular customer. For example, a particular customer may prioritize power savings over throughput performance, and therefore the execution cost corresponding to power consumption may be given a lower weight than the execution cost corresponding to throughput performance (e.g., number of access commands executed per second, or volume of data processed per second, etc.).

FIG. 8 shows an embodiment wherein the sort algorithm may include a "node pruning" operation wherein when the accumulated execution cost corresponding to a path from the root node to any particular node exceeds a threshold, that node may be pruned from the tree so that the execution cost for the branches extending from that node are not considered. In the example of FIG. 8, when the sort algorithm reaches node 48 in the search tree, the accumulated execution cost for that node exceeds a threshold and so the node is pruned from the sort algorithm. In other words, once the accumulated execution cost becomes relatively high for a particular node such that it becomes very unlikely a path through that node will be selected by the sort algorithm, the node can be pruned from the search tree in order to decrease the processing time of the sort algorithm. In one embodiment, the threshold for pruning a particular node from a search tree may be configured based on the current accumulated execution cost of other nodes in the search tree. For example, in one embodiment the sort algorithm may track the accumulated execution cost for each possible path at each level of the search tree. At any given level of the search tree, the sort algorithm may prune a node if its corresponding accumulated execution cost exceeds the accumulated execution cost of the other nodes by a significant amount (e.g., by a predetermined threshold).

As described above, any suitable execution cost may be considered by the sort algorithm when determining the execution order for the queued access commands. Examples of execution costs may include the mechanical latency associated with executing the access commands (which affects the throughput performance), or the power consumed by executing the access commands. Another example execution cost may be the "tail latency" of the access commands which refers to the number of access commands that remain in the command queue for an extended period of time before being selected for execution. That is, in one embodiment the disk drive performance may be measured based on a distribution of execution times for the queued access commands, wherein in one embodiment it may be desirable to minimize the "tail" of the distribution so that most of the access commands are executed near an average execution time. Accordingly in this embodiment, the execution cost may be determined by the age of each queued access command. In one embodiment, at least some of the queued access commands may include an execution time limit, for example, a background access command that needs to refresh a target data track before the data track becomes unrecoverable. Accordingly in this embodiment, the execution cost for an "urgent" access command may be reduced in order to prioritize the access command for execution.

In the embodiments described above, the command queue stores two access commands; however, a command queue of any suitable depth may be employed. In addition, in some embodiments the depth of the command queue may vary over time; for example, the depth of the command queue may vary depending on an operating mode of the disk drive (e.g., high versus low power operating modes), or depending on a workload of the disk drive, or depending on real-time variables such as the optimized state of the sort algorithm (e.g., number of cached branches, or number of pruned nodes, etc.).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head actuated over the disk; and
   control circuitry configured to:
   store a plurality of access commands in a command queue, wherein the access commands are for accessing the disk using the head;
   predict a plurality of future access commands to be inserted into the command queue;
   determine an execution order for the access commands in the command queue based on an associated execution cost of at least some of the access commands in the command queue and an associated execution cost of the future access commands; and
   execute at least one of the access commands in the command queue based on the execution order.

2. The data storage device as recited in claim 1, wherein the control circuitry is further configured to predict the plurality of future access commands based on a history of previously executed access commands.

3. The data storage device as recited in claim 2, wherein the control circuitry is further configured to predict the plurality of future access commands based on the previously executed access commands within a window of the history.

4. The data storage device as recited in claim 3, wherein the window of the history does not include a number of recently executed access commands.

5. The data storage device as recited in claim 1, wherein the control circuitry is further configured to predict the plurality of future access commands based on an access command assigned to a background task.

6. The data storage device as recited in claim 5, wherein the background task comprises a refresh task configured to refresh data stored on the disk by reading and rewriting the data.

7. The data storage device as recited in claim 1, wherein the control circuitry is further configured to:
   determine a first execution order for the access commands in the command queue based on an associated execution cost of at least some of the access commands in the command queue and an associated execution cost of a first one of the future access commands;
   determine a second execution order for the access commands in the command queue based on an associated execution cost of at least some of the access commands in the command queue and an associated execution cost of a second one of the future access commands;
   select between the first execution order and the second execution order; and
   execute at least one of the commands in the command queue based on the selected execution order.

8. The data storage device as recited in claim 1, wherein the control circuitry is further configured to:
   cache the execution cost associated with executing a first and second of the access commands; and
   determine the execution cost of executing the first and second access commands together with a third access command based on the cached execution cost.

9. The data storage device as recited in claim 1, wherein the control circuitry is further configured to:
   determine an associated execution cost of a plurality of paths of a tree sort algorithm, wherein each path corresponds to an execution order for a plurality of the access commands; and
   prune a node of the tree when the associated execution cost of the path exceeds a threshold.

10. A method of operating a data storage device, the method comprising:
    storing a plurality of access commands in a command queue, wherein the access commands are for accessing a disk using a head;
    caching an execution cost associated with executing a first and second of the access commands;

determining an execution cost of executing the first and second access commands together with a third access command based on the cached execution cost;

determining an execution order for the access commands in the command queue based on the execution cost; and executing at least one of the access commands in the command queue based on the execution order.

11. The method as recited in claim 10, further comprising:
predicting a future access command and
determining the execution order based on an execution cost of executing the future access command.

12. The method as recited in claim 11, further comprising predicting the future access command based on the previously executed access commands within a window of a history of previously executed access commands.

13. The method as recited in claim 12, wherein the window of the history does not include a number of recently executed access commands.

14. The method as recited in claim 11, further comprising predicting the future access command based on an access command assigned to a background task.

15. The method as recited in claim 14, wherein the background task comprises a refresh task configured to refresh data stored on the disk by reading and rewriting the data.

16. The method as recited in claim 10, further comprising:
predicting a plurality of future access commands to be inserted into the command queue; and
determining the execution order for the access commands in the command queue based on at least some of the access commands in the command queue and the future access commands.

17. The method as recited in claim 16, further comprising:
determining a first execution order for the access commands in the command queue based on at least some of the access commands in the command queue and a first one of the future access commands;
determining a second execution order for the access commands in the command queue based on at least some of the access commands in the command queue and a second one of the future access commands;
selecting between the first execution order and the second execution order; and
executing at least one of the commands in the command queue based on the selected execution order.

18. The method as recited in claim 10, further comprising:
determining an associated execution cost of a plurality of paths of a tree sort algorithm, wherein each path corresponds to an execution order for a plurality of the access commands;
prune a node of the tree when the associated execution cost of the path exceeds a threshold; and
determining the execution order for the access commands in the command queue based on the execution cost of the plurality of paths of the tree sort algorithm.

19. A data storage device comprising:
a disk;
a head actuated over the disk; and
control circuitry configured to:
store a plurality of access commands in a command queue, wherein the access commands are for accessing the disk using the head;
predict a future access command;
determine an associated execution cost of a plurality of paths of a tree sort algorithm, wherein each path corresponds to an execution order for a plurality of the access commands including the future access command;
determine an execution order for the access commands in the command queue based on the execution cost of the plurality of paths of the tree sort algorithm; and
execute at least one of the access commands in the command queue based on the execution order.

20. The data storage device as recited in claim 19, wherein the control circuitry is further configured to prune a node of the tree when the associated execution cost of the path exceeds a threshold.

* * * * *